United States Patent
Wang et al.

(10) Patent No.: US 12,326,838 B2
(45) Date of Patent: Jun. 10, 2025

(54) IMPLEMENTATION FOR EFFICIENT LOG STORAGE

(71) Applicants: Lemon Inc., Grand Cayman (KY); Beijing Volcano Engine Technology Co., Ltd., Beijing (CN)

(72) Inventors: Hao Wang, Los Angeles, CA (US); Sheng Qiu, Los Angeles, CA (US); Yizheng Jiao, Los Angeles, CA (US); Jianyang Hu, Beijing (CN); Kuankuan Guo, Beijing (CN)

(73) Assignees: Lemon Inc., Grand Cayman (KY); Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/475,943

(22) Filed: Sep. 27, 2023

(65) Prior Publication Data
US 2024/0020277 A1    Jan. 18, 2024

(51) Int. Cl.
| G06F 16/18 | (2019.01) |
| G06F 12/02 | (2006.01) |
| G06F 16/17 | (2019.01) |
| G06F 16/176 | (2019.01) |

(52) U.S. Cl.
CPC ...... *G06F 16/1805* (2019.01); *G06F 12/0253* (2013.01); *G06F 16/1734* (2019.01); *G06F 16/176* (2019.01); *G06F 2212/7205* (2013.01)

(58) Field of Classification Search
None
See application file for complete search history.

(56) References Cited

U.S. PATENT DOCUMENTS

| 10,185,653 | B2 | 1/2019 | Parkes et al. |
| 10,394,915 | B1 | 8/2019 | Raghavendran et al. |
| 11,340,829 | B1* | 5/2022 | Shveidel ............. G06F 12/0871 |
| 2003/0055809 | A1 | 3/2003 | Bhat |
| 2010/0231944 | A1* | 9/2010 | Takahashi .......... H04N 1/00474 358/1.15 |
| 2014/0137222 | A1* | 5/2014 | Nguyen ................ G06F 9/5055 707/803 |
| 2016/0301753 | A1* | 10/2016 | Auch ..................... G06F 15/167 |
| 2017/0221140 | A1* | 8/2017 | Melamed ........... G06Q 30/0645 |
| 2020/0174989 | A1* | 6/2020 | Koza ................... G06F 16/2358 |

OTHER PUBLICATIONS

Extended European Search Report for European Application No. 24197938.4, mailed Feb. 14, 2025, 13 pages.
Xiongpai Q., et al., "A Parallel Recovery Scheme for Update Intensive Main Memory Database Systems", Ninth International Conference on Parallel and Distributed Computing, Applications and Technologies, XP031373748, , IEEE, 2008, pp. 509-516.

* cited by examiner

*Primary Examiner* — Christopher J Raab
(74) *Attorney, Agent, or Firm* — Fish & Richardson P.C.

(57) ABSTRACT

Methods and systems of a log engine for logging data operation in a file system is disclosed. The log engine includes a user interface module configured to receive a plurality of data operation logs that respectively record a data operation and a sequence ID corresponding to an order of the data operation being performed; and a shared log manager configured to provide an in queue configured to consolidate the plurality of data operation logs, and swap the plurality of data operation logs to an out queue with the plurality of data operation logs being ordered based on the sequence ID and saved in a shared log.

20 Claims, 10 Drawing Sheets

IMPLEMENTATION FOR EFFICIENT LOG STORAGE

FIELD

This disclosure is directed to key-value stores and file systems. Particularly, this disclosure is directed to a log engine for managing log data for the key-value stores and file systems.

BACKGROUND

Log data are used in key-value stores, such as existing database systems that use log structured merge trees. These offer rapid data ingestion but can have tradeoffs regarding write amplification, resource contention, relatively poor read performance, and computational overhead.

SUMMARY

This disclosure is directed to key-value stores and file systems. Particularly, this disclosure is directed to a log engine for managing log data for the key-value stores and file systems.

Log data can be included in data center log files for recording data operations. Log files can include log of data operation, of metadata, and/or the like. In some embodiments, log data can be any time series data that include scientific or experimental data over time, financial or economic data over time, and any other data and their sequential information being received and recorded. Log data can be implemented as append-only files that additional log data are added only to the tail end the data.

To achieve data consistency and integrity, each data operation in the log engine can be assigned a unique sequence ID, allowing data arrangement on disk in the order according to the sequence ID. This sequencing mechanism can support error recovery and maintaining the reliability of log files used in upper-layer software applications. Further, the sequencing mechanism and/or, storing log data in a predefined file size in consecutive memory allocation (e.g., by requesting an extend of memory allocation), eliminates or reduces random writes on SSDs. The reduction of random writes to the SSDs reduces tail latencies and improves the efficiency of managing in-memory file metadata updates. Operations can be ordered using and according to the unique sequence IDs, thereby ensuring order on the disk (e.g., SSD). High reliability is achieved through cyclic redundancy check (CRC) protection for the log files. The redundancy check protection provided by the log engine can enable error recovery in upper-layer software. It is appreciated that the log engine can include CRC protection conducted for error detection in the log files that supports error recovery and improve reliability. In an embodiment, the shared log manager (e.g., 420 of FIG. 4) can be configured to conduct CRC on the log files.

By aggregating operations from multiple users into a shared log to be processed in one I/O operation, the log engine can handle large throughput demands of data operations with reduced write amplification and improving storage efficiency. Concurrently, by adapting a shared log, the log engine can adopt a lock-free queue to minimize thread blocking, enabling high concurrency and better resource utilization.

By including a background thread to periodically save in-memory data (e.g., log data, metadata, and/or the like) to the underlying file system when the in-memory data reaches a certain size, the log engine can reduce memory overhead. This approach allows a data memory usage ratio (e.g., a percentage of memory use for log files to a total memory size) as low as 0.1%, allowing for efficient memory management and freeing up resources for other tasks.

By predefining a file size, the log file size (e.g., a metadata log file, an operation log file, or the like) is implicitly fixed. For example, the file size related metadata is synchronized when a new extend of memory is allocated to the data to accommodate a larger file size. Requesting and allocating a new extend, or the next extend, is relatively less frequent compared to the overall number of synchronization for append-only files (e.g., log files). Generally, a synchronization function triggers two separate input/output (I/O) operations: one for updating the data and another for updating the metadata of a specific file, resulting in at least two I/O operation per synchronization operation. By reducing, or eliminating, the need for updating file sizes, the Write Amplification Factor (WAF) for the log engines can be reduced, in some embodiments, by 1, substantially increasing the efficiency of the system.

It is appreciated that the disclosure describes the log engine for log data with respect to a log engine for a file system. However, the embodiments of log engine disclosed in this application are to be considered in all respects as illustrative and not limitative to file system applications only. For example, the log engine for recording time series data can be a log engine for recording scientific or experimental data over time (e.g., temperature, pressure, concentration, etc.), financial or economic data over time (e.g., stock price, future price, etc.), and any other data and their sequential information being received (e.g., order being received) is recorded by the log engine.

In an embodiment, a log engine for logging data operation in a file system is disclosed. The log engine includes a user interface module configured to receive a plurality of data operation logs that respectively record a data operation and a sequence ID corresponding to an order of the data operation being performed; and a shared log manager configured to provide a lock-free in queue configured to consolidate the plurality of data operation logs, and swap the plurality of data operation logs to an out queue with the plurality of data operation logs being ordered based on the sequence ID and saved in a shared log.

In an embodiment, the log engine includes a key-value file system collaborator configured to persist the shared log in a predefined file size allocation for updating the shared log.

In an embodiment, when saving the shared log in a persistent storage, a key-value file system collaborator is configured to omit metadata on a file size of the shared log.

In an embodiment, the shared log manager is configured to request an extend of memory allocation for storing the shared log when the shared log having a file size exceeds a predefined file size allocation.

In an embodiment, the shared log includes the plurality of data operation logs in sequential order based on the sequence ID and extended memory allocations such that tail latency from random write is avoided.

In an embodiment, the log engine includes a metadata manager, the metadata manager configured to make a log file of a metadata log persistent when the log file exceeds a predefined file size.

In an embodiment, the log engine includes a garbage collection module of the log engine, the garbage collection module configured to chronologically validate entries in the shared log.

In an embodiment, the log engine includes a recovery manager configured to read a checkpoint file for executing a fuzzy checkpoint to recover from a system failure.

In an embodiment, the log engine includes a background thread configured to remove a metadata log to persistent storage when the metadata log exceeds a predefined file size.

In an embodiment, the shared log manager is configured to conduct a cyclic redundancy check for error detection in a log file.

In an embodiment, a method for logging data operation in a file system is disclosed. The method includes receiving a plurality of data operation logs that respectively record a data operation and a sequence ID corresponding to an order of the data operation being performed; consolidating the plurality of data operation logs in a lock-free in queue; and swapping the plurality of data operation logs to an out queue with the plurality of data operation logs being ordered based on the sequence ID and saved in a shared log.

In an embodiment, the method includes persisting the shared log in a predefined file size allocation for updating the shared log while omitting metadata on a file size of the shared log.

In an embodiment, the method includes requesting an extend of memory allocation for storing the shared log when the shared log having a file size exceeds a predefined file size allocation.

In an embodiment, the method includes making a log file of a metadata log persistent when the log file exceeds a predefined file size.

In an embodiment, the method includes chronologically validating entries in the shared log for garbage collection.

In an embodiment, the method includes reading a checkpoint file for executing a fuzzy checkpoint to recover from a system failure.

In an embodiment, a computer-readable medium containing instructions that, when executed by a processor, direct the processor to receive a plurality of data operation logs that respectively record a data operation and a sequence ID corresponding to an order of the data operation being performed; provide an in queue configured to consolidate the plurality of data operation logs; and swap the plurality of data operation logs to an out queue with the plurality of data operation logs being ordered based on the sequence ID and saved in a shared log.

In an embodiment, the computer-readable medium further containing instructions that, when executed by the processor, persist the shared log in a predefined file size allocation for updating the shared log while omitting metadata on a file size of the shared log.

In an embodiment, the computer-readable medium further containing instructions that, when executed by the processor, request an extend of memory allocation for storing the shared log when the shared log having a file size exceeds a predefined file size allocation.

In an embodiment, the computer-readable medium further containing instructions that, when executed by the processor, make a log file of a metadata log persistent when the log file exceeds a predefined file size.

In an embodiment, the computer-readable medium further containing instructions that, when executed by the processor, chronologically validate entries in the shared log for garbage collection.

In an embodiment, the computer-readable medium further containing instructions that, when executed by the processor, read a checkpoint file for executing a fuzzy checkpoint to recover from a system failure.

DRAWINGS

DETAILED DESCRIPTION

Figure 1:
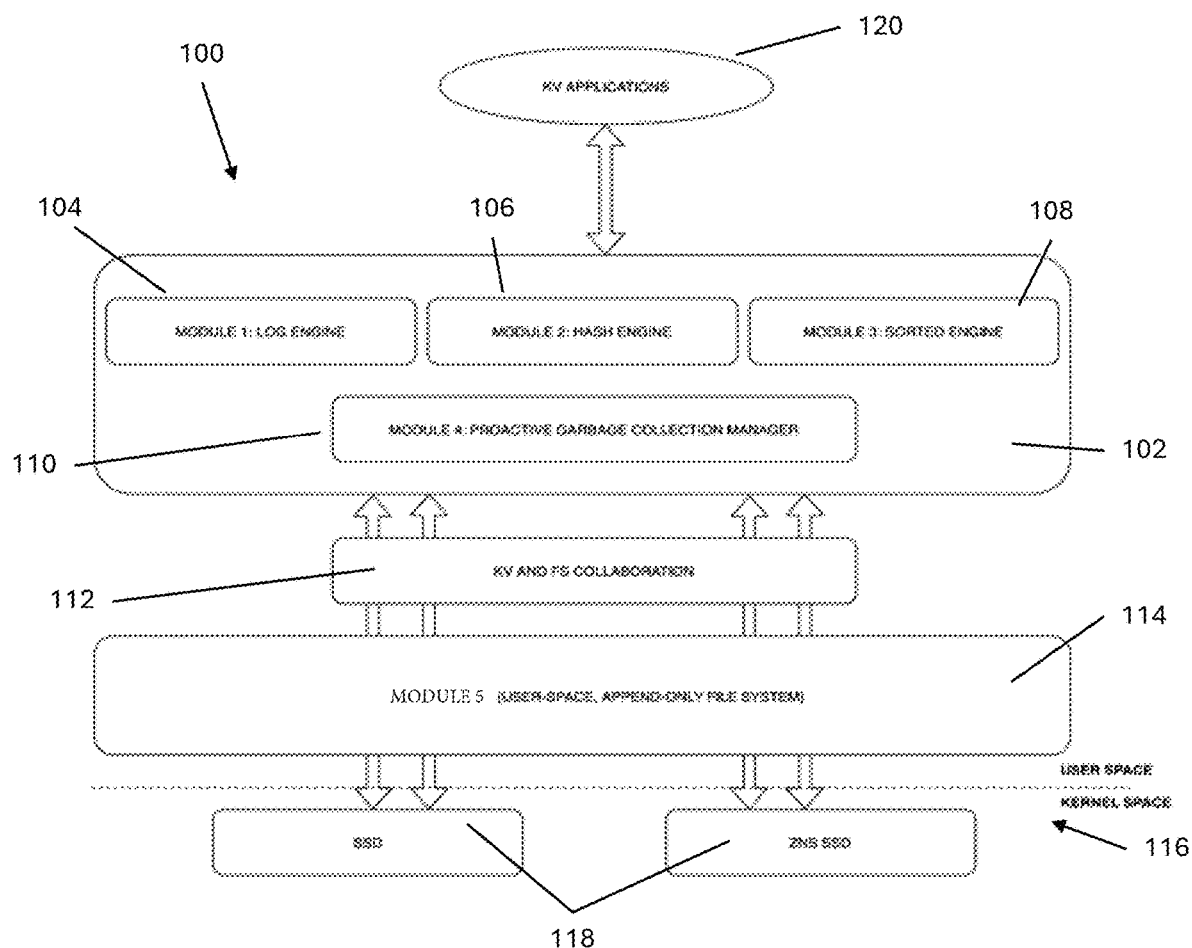
FIG. 1 shows a schematic of a key-value store and file system according to an embodiment.

This disclosure is directed to key-value stores and file systems. Particularly, this disclosure is directed to a log engine for managing log data for the key-value stores and file systems.

In the following detailed description, reference is made to the accompanying drawings, which form a part of the description. In the drawings, similar symbols typically identify similar components, unless context dictates otherwise. Furthermore, unless otherwise noted, the description of a successive drawing may reference features from any previous drawing to provide clearer context and a substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described and recited herein, as well as illustrated in the drawings, may be arranged, substituted, combined, separated, and designed in a wide variety of different configurations, all of which are explicitly contemplated herein.

Additionally, portions of the present disclosure may be described herein in terms of functional block components and various processing steps. It should be appreciated that such functional blocks may be realized by any number of firmware, software, and/or hardware components configured to perform the specified functions.

FIG. 1 shows a schematic of a key-value store and file system according to an embodiment. Key-value store and file system 100 includes key-value system 102. Key-value system 102 includes a log engine 104, a hash engine 106, a sorting engine 108, and a garbage collection manager 110. Key-value store and file system 100 further includes a collaboration layer 112 and file system 114. Key-value store and file system 100 can interact with a kernel space 116, kernel space 116 including one or more disks 118. The key-value store and file system 100 can interact with applications 120.

Key-value and file system 100 can be used for storage in cloud applications, for example to provide data persistence required by cloud services. Key-value system 102 is configured to provide a key-value store, for example as part of a storage backend for cloud services. Non-limiting examples of cloud services using key-value systems 102 include shopping, social media, metadata management, and the like. File system 114 can be a dedicated user-level append-only file system configured to provide storage specialized to facilitate operation of key-value system 102.

Log engine 104 is configured to allow concurrent writing of multiple log files, thereby reducing the number of compaction and garbage collection operations. The logs written by log engine 104 can be configured such that strong sorting is not required for handling of said logs. Log engine 104 is configured to improve throughput performance issue in log writes and increase recovery speed by reducing the sync write overhead of logs from multiple input/output (I/O) operations to a single I/O operation, aggregating writes using a lock-free queue to control latency and improve throughput, and/or providing asynchronous interfaces to enhance the thread model. Where key-value system 102 and file system 114 are integrated and collaborate, the log engine 104 can be used to store a write-ahead log (WAL) having a predefined structure having a defined actual file size. The defined file size for the WAL can in turn result in requiring fewer I/O operations, thereby enhancing performance while mitigating potential tradeoffs regarding data consistency. The operation of a log engine 104 is further detailed in in FIGS. 4-8 and described below.

Hash engine 106 is configured to handle point queries within the key-value system 102. In particular, hash engine 106 is configured to reduce tail latency in point queries. The hash engine 106 includes separation of data and index components, and maintenance of the index in a cache memory, for example by compression of the index and/or caching of partial data. The partial data can be selected using, for example, a least recently used strategy.

Sorting engine 108 is configured to carry out range scan operations while reducing the write-amplification factor and/or read/write latency associated with such operations. Sorting engine 108 is configured to can use a partitioned log-structured merge (LSM) tree. The classification of I/O flows and scheduling of tasks can further be carried out by sorting engine 108.

Garbage collection manager 110 is configured to carry out garbage collection and/or compaction operations in key-value and file system 100. The garbage collection manager 110 can be configured to reduce unnecessary data movement during garbage collection and/or compaction operations in key-value and file system 100. The garbage collection manager 110 can conduct garbage collection and/or compaction operations based on awareness regarding application-side data deletion such as expiration of pages. Garbage collection and compaction carried out by garbage collection manager 110 can be configured to arrange the data to support other modules such as sorting engine 108. The garbage collection manager 110 can coordinate preservation of data during the garbage collection and/or compaction operations.

Collaboration layer 112 is configured to facilitate collaboration between key-value system 102 and file system 114. Collaboration layer 112 can further facilitate efficient compaction and/or garbage collection operations in key-value system 102 based on the collaboration between the key-value system 102 and file system 114. The collaboration can reduce write amplification issues arising from compaction and/or garbage collection operations. In an embodiment, the collaboration layer 112 can expose zone usage information from key-value system 102 to the file system 114.

File system 114 can be configured to split data from logs and use log-structured append-only writing as the write model. In an embodiment, the file system can further provide pre-allocated data space where sync writes only occur for the persistence of data, and in an embodiment, do not need to make metadata persistent. In an embodiment, the data persistence for different files and global log persistence can be executed separately. These aspects of the file system can allow the file system to avoid some metadata persistence operations, such as those caused by single data write persistence operations.

The file system 114 can be configured to support general files and instant files. Both general and instant files can be written sequentially, and both can be read either sequentially or randomly. General files can be optimized for consistently low latency in either sequential or random reads. General files can be used for writing data in batches that do not require flushing the data to disk after each write, such as SST files. The storage space is allocated in large units, with a non-limiting example of unit size being 1 MB each. The large allocation unit can reduce metadata size for general files, such that metadata of all general files can be kept in memory during normal file system operation. By keeping the metadata in memory, no read operation to general files would require further I/O for metadata access, regardless of the read offset. This can reduce read tail latency for general files. Instant files can be optimized for fast, incremental synchronous writes while having good sequential and random read performance near the tail. Instant files can be used for writing data that requires frequent flushing to disk for instant durability, such as write-ahead log files of the key-value system. The data and metadata of each individual write can be bundled together for instant files. The bundled data and metadata can be written to a journal file shared by all instant files. The bundling of data and writing to the journal file can improve the speed of incremental write and sync operations. This approach is structured to support sequential reads, but can have tradeoffs regarding random reads. Since instant files are expected to be mostly read sequentially, with random reads mostly concentrated near the tail most recently written data of each instant file that is actively being written can be cached to improve read performance.

The file system 114 can include a user-space I/O scheduler to assign I/O priority to different I/O types. The I/O scheduler will mark foreground I/O as high priority while background I/O will be marked as low priority. In addition, the key-value system 102 can include a scheduler to schedule its background tasks in order to ensure that each I/O issued by the upper layer applications has a consistent I/O amplification. Through this co-design of I/O scheduling in both key-value system 102 and file system 114, the tail latency can be kept stable and low as both the I/O amplification and I/O latency are consistent. Moreover, reading general files from the file system requires no I/O for metadata, and use of large spaces for the general files can ensure that most read operations require a single I/O.

Kernel space 116 can contain disks 118. Disks 118 can include one or more storage media, such as solid state drives (SSDs). In an embodiment, at least some of disks 118 are zoned storage (ZNS) SSDs.

Applications 120 are any suitable applications utilizing the key-value and file system 100, for example, online shopping, social media, metadata management applications, or the like. The applications 120 can interface with key-vale and file system 100 through any suitable application programming interface (API). In an embodiment, the API can be specific for the particular type of file, for example having the nature of the files as general files or instant filed be determined by the API through which the file has been received.

Figure 2:
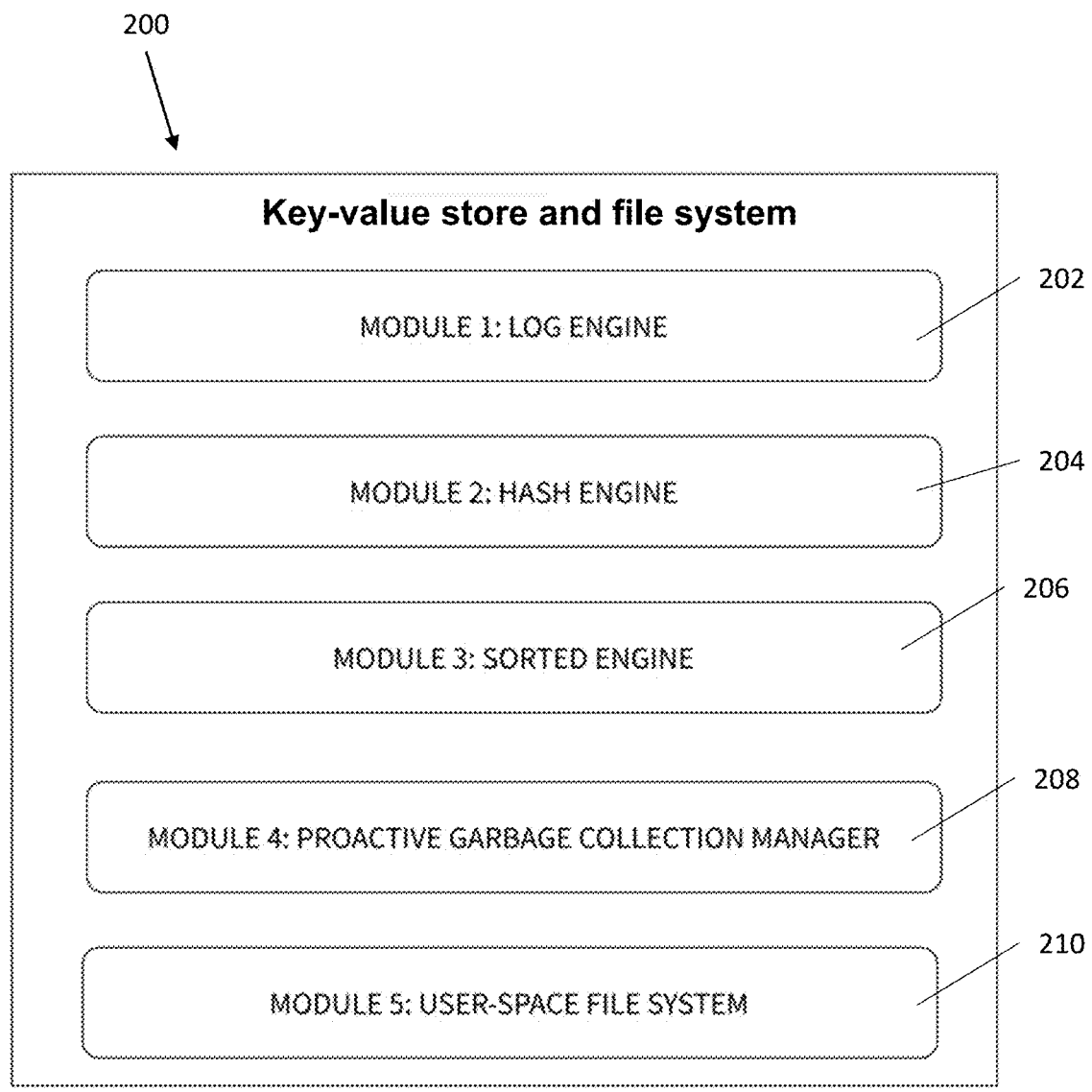
FIG. 2 shows modules of a key-value store and file system according to an embodiment.

FIG. 2 shows modules of a key-value store and file system according to an embodiment. Key-value store and file system 200 includes log engine 202, hash engine 204, sorting engine 206, garbage collection manager 208, and file system 210.

Log engine 202 is configured to allow concurrent writing of multiple log files, thereby reducing the number of compaction and garbage collection operations. The logs written by log engine 202 can be configured such that strong sorting is not required for handling of said logs. Log engine 202 is configured to improve throughput performance issue in log writes and increase recovery speed by reducing the sync write overhead of logs from multiple input/output (I/O) operations to a single I/O operation, aggregating writes using a lock-free queue to control latency and improve throughput, and/or providing asynchronous interfaces to enhance the thread model. The operation of log engine 202 is further detailed in FIGS. 4-8 and described below.

Hash engine 204 is configured to handle point queries within the key-value and file storage system 200. In particular, hash engine 204 is configured to reduce tail latency in point queries. The hash engine 204 includes separation of data and index components, and maintenance of the index in a cache memory, for example by compression of the index and/or caching of partial data. The partial data can be selected using, for example, a least recently used strategy.

Sorting engine 206 is configured to carry out range scan operations while reducing the write-amplification factor and/or read/write latency associated with such operations. Sorting engine 206 is configured to can use a partitioned log-structured merge (LSM) tree. The classification of I/O flows and scheduling of tasks can further be carried out by sorting engine 206.

Garbage collection manager 208 is a proactive garbage collection manager for key-value store and file system 200. Garbage collection manager 208 can be configured to reduce unnecessary data movement during garbage collection and/or compaction operations in key-value and file system 200. The garbage collection manager 208 can conduct garbage collection and/or compaction operations based on awareness regarding application-side data deletion such as expiration of pages. Garbage collection and compaction carried out by garbage collection manager 208 can be configured to arrange the data to support other modules such as sorting engine 206. The garbage collection manager 208 can coordinate preservation of data during the garbage collection and/or compaction operations.

File system 210 can be an append-only file system for key-value storage. File system 210 can be configured to split data from logs and use log-structured append-only writing as the write model. In an embodiment, the file system 210 can further provide pre-allocated data space where sync writes only occur for the persistence of data, and in an embodiment, do not need to make metadata persistent. In an embodiment, the data persistence for different files and global log persistence can be executed separately. These aspects of the file system can allow the file system to avoid some metadata persistence operations, such as those caused by single data write persistence operations.

Figure 3:
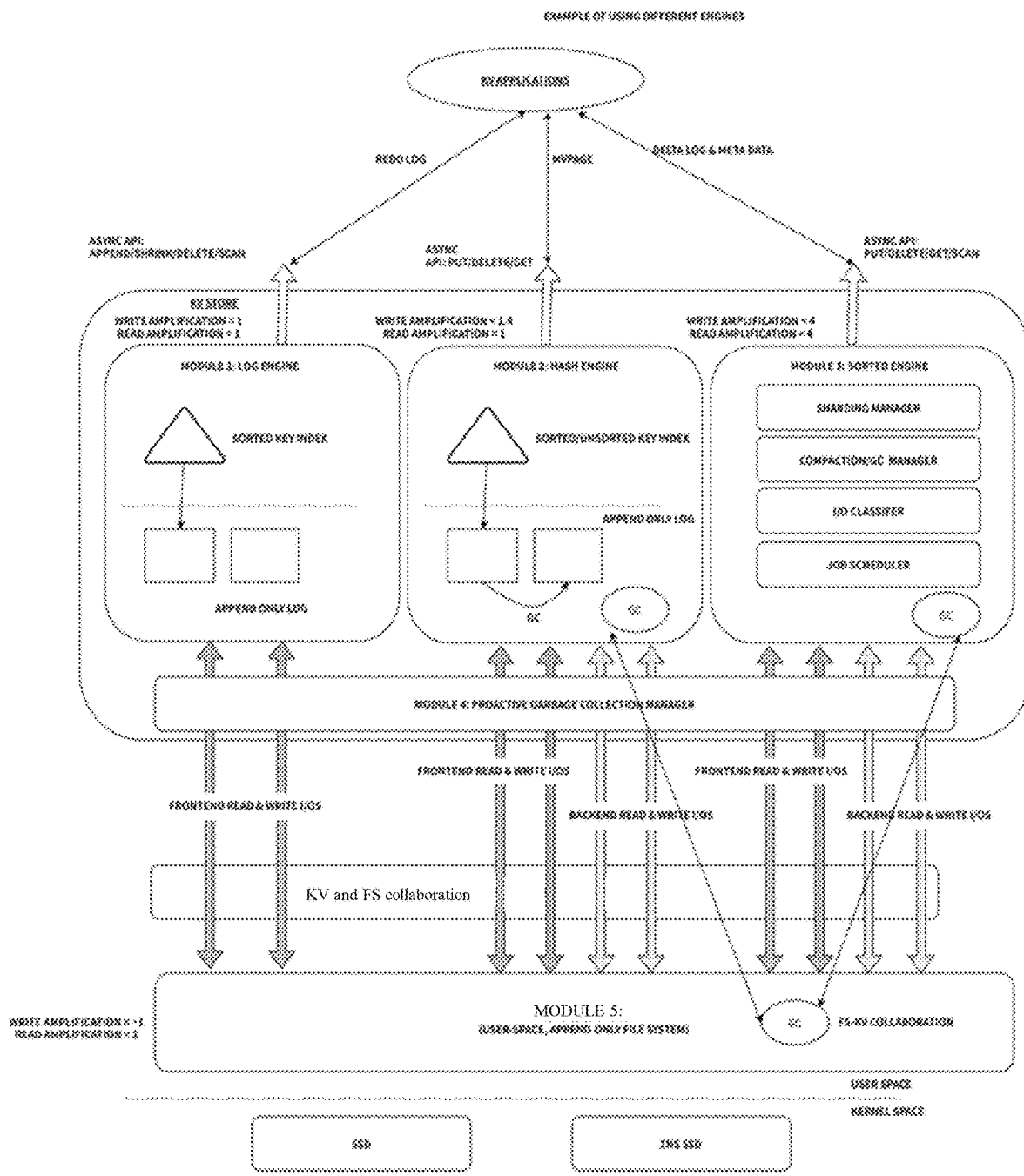
FIG. 3 shows a key-value store and file system handling a plurality of I/O flows according to an embodiment.

FIG. 3 shows a key-value store and file system handling a plurality of I/O flows according to an embodiment. FIG. 3 shows the utilization of the modules shown in FIGS. 1 and 2 and further described herein. In the embodiment shown in FIG. 3, the key-value store and file system is interfacing with a MySQL compatible OTLP database's pageserver. The interface with a MySQL compatible OTLP database's pageserver is a non-limiting example of one suitable application for interfacing with the key-value store and file system according to an embodiment. As shown in FIG. 3, the database pageserver utilizes the key-value store and file system to store each of a base page, an MVPage, a delta log, and a redo log. The key-vale and file system can index and make persistent the redo logs from the database pageserver using the log engine. These operations can have read and write amplifications each of 1. The MVPage can be handled utilizing the hash engine. Delta log and metadata can each be handled utilizing the sorting engine.

Figure 4:
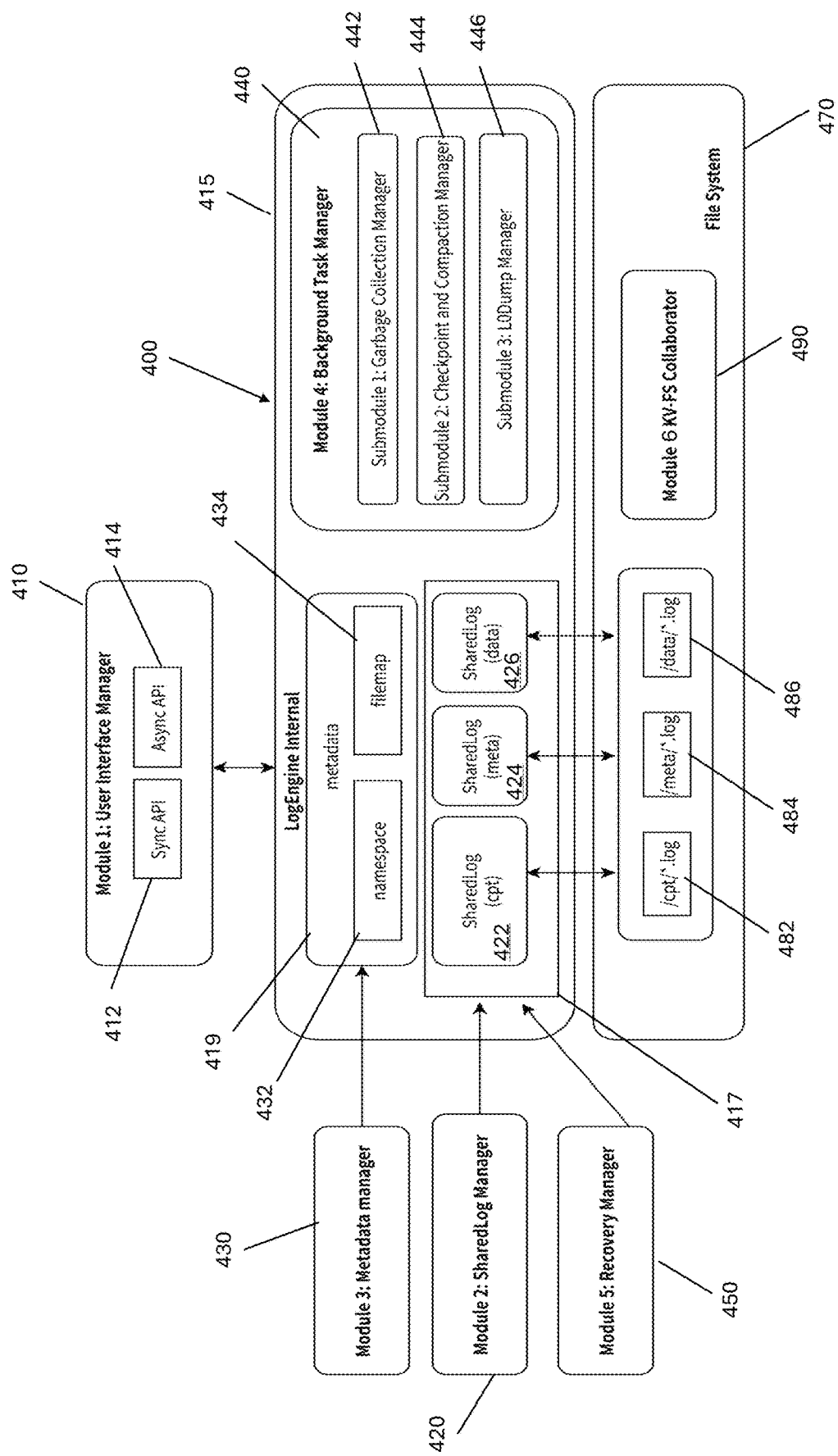
FIG. 4 shows an architecture of a log engine for recording log data according to an embodiment.

FIG. 4 shows an architecture of a log engine 400 for recording log data according to an embodiment. The log engine 400 is configured to receive user input and records the order of the operation of the input. It is appreciated that the log engine 400 can be configured for recording any time series data such as scientific or experimental data over time (e.g., temperature, pressure, concentration, driving log, etc.), financial or economic data over time (e.g., stock price, future price, etc.), and any other data and their sequential information being received (e.g., order being received) is recorded by the engine. In an embodiment, the log engine 400 can be the log engine 201 or the log engine 202 as described above and discussed in FIG. 1 or 2.

The log engine 400 includes a user profile manager 410, internal components 415, and a key value file system (KV-FS) collaborator 490.

The user profile manager 410 provides an interface between the internal components 415 and the user client. The user profile manager 410 interfaces between the internal components 415 and user clients for providing synchronous and asynchronous communication(s) through input/output (I/O) application programming interface(s) (API). A synchronous API 412 can be configured to real time communication between the user clients to the internal components 415, receiving instructions and/or logging inputs from the user clients. An asynchronous API 414 can be configured to queue or batch I/O instructions and processing the I/O once a resources for processing the I/O becomes available or is assigned to the batched I/O.

The synchronous or asynchronous API(s) includes one or more functional API(s) that perform data processing functions, e.g., for processing instructions or I/O related to the user clients. The functional APIs include a log file organizer, a log file editor, and a log file iterator. By providing the functional APIs, and/or restricting I/O functions outside of the provided functional APIs, the APIs ensure efficient and reliable management of log files using a predetermined pattern.

The log file organizer, or a Log File Factory, provides methods for creating, opening, and deleting log files through, e.g., a LogFileFactory object.

The creating function includes, upon receiving a request or instruction from a user client, creating a log file with a specified name. In an embodiment, the creating function includes returning a status indicator indicating whether the creating function was successful.

The opening function includes, upon receiving a request or instruction from a user client, opening a log file. The log file can be identified by a log file name included in the request or instruction. The opening method includes, upon opening the log file, returning a status indicator indicating whether the opening function was successful.

The deleting function includes, upon receiving a request or instruction from a user client, deleting a log file. The log file can be identified by a log file name provided included in the request or instruction. If the deletion is successful, the deleting function returns a status indicator for completing the deletion (e.g., by including an indicator retuning a message absl::OkStatus( )).

If the creating, opening, and/or deletion function(s) cannot be completed, the respective function returns an error indicating, e.g., the log file does not exist (e.g., by including an indicator returning a message "NotFound") or an error status indicating the cause of failure.

A log file editor facilitates user opening, modification, and closing of log files upon request or instruction received from a user client. The log file editor, or log file editor API, provides user access to interact with log files and ensuring proper appending, deletion, and retrieval of log data. The log file editor includes a put function, a trim function, and a truncate function.

The put function appends a number of bytes of log data to a log file at the end of the log file. The put function can request or receive a sequence ID (e.g., sequence number or "seqnum") in the request or instruction from the user client. The sequence ID from the user client is monotonically increasing to the current maximum sequence ID to ensure proper ordering of log file recorded over time. In an embodiment, the sequence ID are unique numbers that sequentially order log data stored on disk. It is appreciated that the total order of the log data may be sequentially organized on disk such that latencies from random writes are eliminated. If the sequence ID provided by the user client is the same or smaller than the current maximum sequence ID, the put function returns an error indicating the sequence ID error. Upon successful append, the put function returns an indicator for completion of the appending operation (e.g., by returning a message including "absl::OkStatus( )"). If the appending operation cannot be completed, the put function returns an error code corresponding to the error.

The trim function deletes log records with sequence IDs less than a provided sequence ID. The truncate function deletes log records with sequence IDs greater than a provided sequence ID. The log record having a provided sequence ID can be deleted by the trim function, the truncate function, and/or the like.

The log file editor, or LogFile, include a size function that returns the size of log data available to the user, a log count function (e.g., a NumRecords function) that returns the total number of records in the log file, a close function to close log file releasing occupied resources and provide proper resource management.

The log file iterator facilitates users sequentially reading of the log files that is convenient and efficient for users to traverse and read log files in a controlled manner. The log file iterator includes one or more functions.

An iterator function creates an iterator for a log file (e.g., the log file currently viewed by a user) and returns an integrator pointer if successful. A seek function requests or receives a sequence ID from a user client and positions the iterator to the first record with a sequence ID greater than or equal to the sequence ID. A validation function checks if a record pointed by the iterator is valid. A next function moves the iterator to the next record in the log file. A sequence function returns the sequence ID of the log record. A size function returns the size of the data in the log record. A status function retrieves a current status (e.g., a function is success or failed) of the iterator. A read function reads data from the current log file pointed by the iterator. The read function can take an internal offset within the log file and the number of bytes to read and returns an indicator indicating the success of the read operation or an error code corresponding to the error.

The internal components 415 includes a shared log manager 420, a metadata manager 430, a background task manager 440, and a recovery manager 450 being disposed between the file system 470 and the user interface manager 410, facilitating I/O requests from user clients.

The shared log manager 420 consolidates the data processing request (e.g., append, create, delete, trim, and/or truncate functions, and the like). The shared log manager 420 creates and manages consolidated log data 417 that include respective shared logs for metadata 424, user data 426, and checkpoint (CPT) files 422. In an embodiment, the shared log manager 420 uses "inqueue" and "outqueue" to effectively handle the data by consolidating processing requests from user clients. In an embodiment, upon a rollover, the shared log for user data 426 is encoded and persistently saved in the file system as a data log 486. The shared log manager 420 is further described below with respect to FIGS. 5 and 6.

The metadata manager 430 creates, trims, and saves metadata 419 for the log engine 400. The metadata 419 can include namespace 432 that maintains the mapping of file names to file identifiers. Filemap 434 tracks the mapping of file identifiers to LSM meta instances. The metadata manager 430, upon a threshold event, moves the metadata 419 to persistent storage. The metadata manager 430 is described below with respect to FIGS. 7 and 8.

The background task manager 440 organizes the execution of background functions, providing background functions for maintaining the engine 400. In the illustrated example, the background module provides data processing using one or more background thread. The background task manager 440 includes a garbage collection manager 442, a checkpoint and compaction manager 444, and a L0Dump manager 446.

The garbage collection manager 442 identifies and deletes dirty bytes which are data become invalid due to, for example, trim, delete, truncate functions in the shared log manager 420 for efficient management and removal of unnecessary data, optimizing system performance and storage utilization.

In an embodiment, the garbage collection manager 442 begins with garbage data marking when one or more operations that may create dirty bytes is executed. For example, the garbage data marking can be triggered by execution of a trim or delete function, or the like, in the shared log manager 420. The garbage collection manager 442 then proceeds to garbage data calculation.

At garbage data calculation, the garbage collection manager 442 adds the size of the newly created dirty bytes to garbage data statistics stored in volatile or persistent memory. The garbage data statistics includes an actual or proxy size of accumulated garbage data.

In an embodiment, where the user data are indexed fully, and/or directly indexed, in-memory (e.g., in volatile memory or L0), the newly generated dirty bytes can include user data and metadata. The size of the newly generated dirty bytes can be the sum of the user data and the metadata in L0. In another embodiment, where the user data is indirectly indexed, dirty bytes can include a L0 portion and a L1 portion. The L0 portion can be data in volatile memory. The L0 portion dirty bytes include user data and metadata in L0.

The L1 portion can be data in persistent storage. In an embodiment, the size of user data, or dirty bytes, can be estimated to be an average size of user data in persistent storage, avoiding reading the indirect index for size calculation during the trim or delete function, or the like, that complete with front end functions. Using the average size of user data as a proxy to actual size of a set of user data in L1 portion reduces computation overhead.

Once a threshold event occurs for triggering a garbage data calculation, the garbage collection manager 442 proceeds to reenter garbage data statistics and executes a garbage collection process.

In an embodiment, the threshold event is when a total garbage data amount (e.g., the size of the accumulated garbage data) exceeds the capacity of one physical log, constitutes more than a percentage (e.g., 20%, 30%, 40%, or the like) of the total system data, or the like. The threshold event occurs if one or more of the conditions are met. In an embodiment, the threshold event occurs when both conditions (e.g., exceeds the capacity of one physical log and more than 30% of the total system data) are met. It is appreciated that the total system data can be the total size of in-memory user data and metadata and, if any, the total L1 portion data estimated from the average size of user data.

It is appreciated that dirty bytes or invalid files are generally unmarked. In executing garbage collection, the garbage collection manager 442 generally starts with determining the validity of the data in a file. In an embodiment, the garbage collection manager 442 determines the validity of the file chronologically (e.g., from the oldest towards the newest) as older log files are more likely to be no longer used and become invalid. In an embodiment, the log files are ordered by the sequence IDs such as the older log files have smaller sequence IDs and the newer files have larger sequence IDs. The validity checking of the garbage collection is executed by a background thread. The background thread traverses and scans the oldest log file, determining data validity through querying index metadata, e.g., against the user data. If the corresponding user data is found, the log file is valid and is moved to a newer position. In an embodiment, the newer position can be the newest log file position. If the corresponding user data is not found, the oldest log file is invalid. The oldest log file is marked dirty and/or deleted.

Then, the garbage data statistics is recalculated and/or re-entered to update the garbage data statistics. In an embodiment, the garbage data is indexed in-memory, and the garbage data statistics is updated and recorded in-memory. Upon re-entry, the total garbage data amount is recalculated based on the total system data and the validated data. The garbage collection manager 442 determines again if the threshold event still occurs for triggering the garbage data calculation. If the threshold event still exists, the garbage collection manager 442 scans the next oldest log files, which is now at the oldest position, for validation. If the threshold event no longer exists, the garbage collection manager 442 ends the garbage collection process.

In an embodiment, after the log file validity is determined to be valid and moved, a foreground logic (e.g., instructions from a user deleting or trimming the log file) invalidating the log file, the newly written log file is marked dirty and/or deleted.

In an embodiment, during validation of a log file, a background thread exits the garbage collection process and re-enters to continue with the garbage collection, the index validity and the storage address for the user data are compared to determine if the log data is already validated. In such case, a validated log file does not need to be moved again.

The checkpoint and compaction manager 444 rollovers the metadata log when the metadata in the metadata log reaches or excess a predetermined size for creating a new checkpoint file. The new checkpoint file can be then saved in the file system (e.g., shown as cpt log 482). The checkpoint and compaction manager 444 is described below with respect to FIG. 9.

The L0Dump manager 446 rollovers the data log when the data log reaches or excess a predetermined size. A data log can be a file containing a series of log information or log data. The L0Dump manager 446 creates a new data log to continue saving new log information in the new data log. The rollover process allows the durability and reliability of the log engine 400 by persistently storing metadata and volatile memory log data (e.g. L0 information) during a data log rollover event. At least a portion of the log information is saved as in-memory data (e.g., L0 information stored in volatile memory) which can be periodically flushed to the persistent storage (e.g., shown as data log 486) in the file system to maintain consistency and prevent data loss, e.g., during a power outage, system failures, or crashes.

The L0Dump manager 446 begins rollover by scanning the namespace 432. Namespace 432 maps file names to their corresponding metadata that contain information such as a file ID, an offset, a sequence ID, and/or the like.

Then, the L0Dump manager 446 encodes the in-memory data to a persistent format file (e.g., L0Dump format) for persistent storage. Then, the persistent format file is saved in persistent storage (e.g., on a SSD, disk, or the like) and the metadata in the persistent format file is written to Metalog which is a log file that records metadata and other information, e.g., for recovery. The L0Dump manager 446 continues to scan, encode, and store persistent format files until all files in the namespace 432 are processed. This ensures that the metadata for the log data are recorded in the Metalog to support recovery in case of system failures or crashes.

The KV-FS collaborator 490 interfaces between the log engine 400 and the file system 470 for syncing consolidated log data 417 in the log engine 400 and the file system 470. Log files used in the file system and log engine 400 are append-only files. Generally, syncing functions (e.g., fsync or fdatasync) trigger two separate I/O operations: one for updating the data and another for updating the file size, resulting in an increased input/output overhead and Write Amplification Factor (WAF). For example, fsync ensures data consistency by synchronizing both the user data (i.e., a first I/O) and the metadata (i.e., a second I/O) of a specific file. The function fdatasync syncs only data needed to ensure a subsequent data retrieval can be correctly handled. For append-only files being synced, fdatasync syncs both user data and metadata, triggering two I/O operations like fsync.

The KV-FS collaborator 490 syncs user data, but not the file size which is generally saved in the metadata for the user data, unless a new unit or extend of storage is allocated for accommodating the new user data. In an embodiment, the file size is predefined (e.g., by WAL) and can be identified by the user application, upper-layer software, or the like. It is appreciated that allocating a new extend or next extend is a relatively infrequent event compared to the overall number of synchronization, reducing the number of system operation in most instances of synchronization. Accordingly, the KV-FS collaborator 490 avoids the I/O operation for data size communication during synchronization, for example, by omitting transmitting metadata on the file size. In an embodiment, the metadata of the user data is omitted. Comparing to synchronization for append-only file that always includes an I/O for a file size, the KV-FS collaborator 490 effectively lowers the overall WAF by 1. This leads to improved performance and enhanced data consistency, improving performance, and data integrity.

Figure 5:
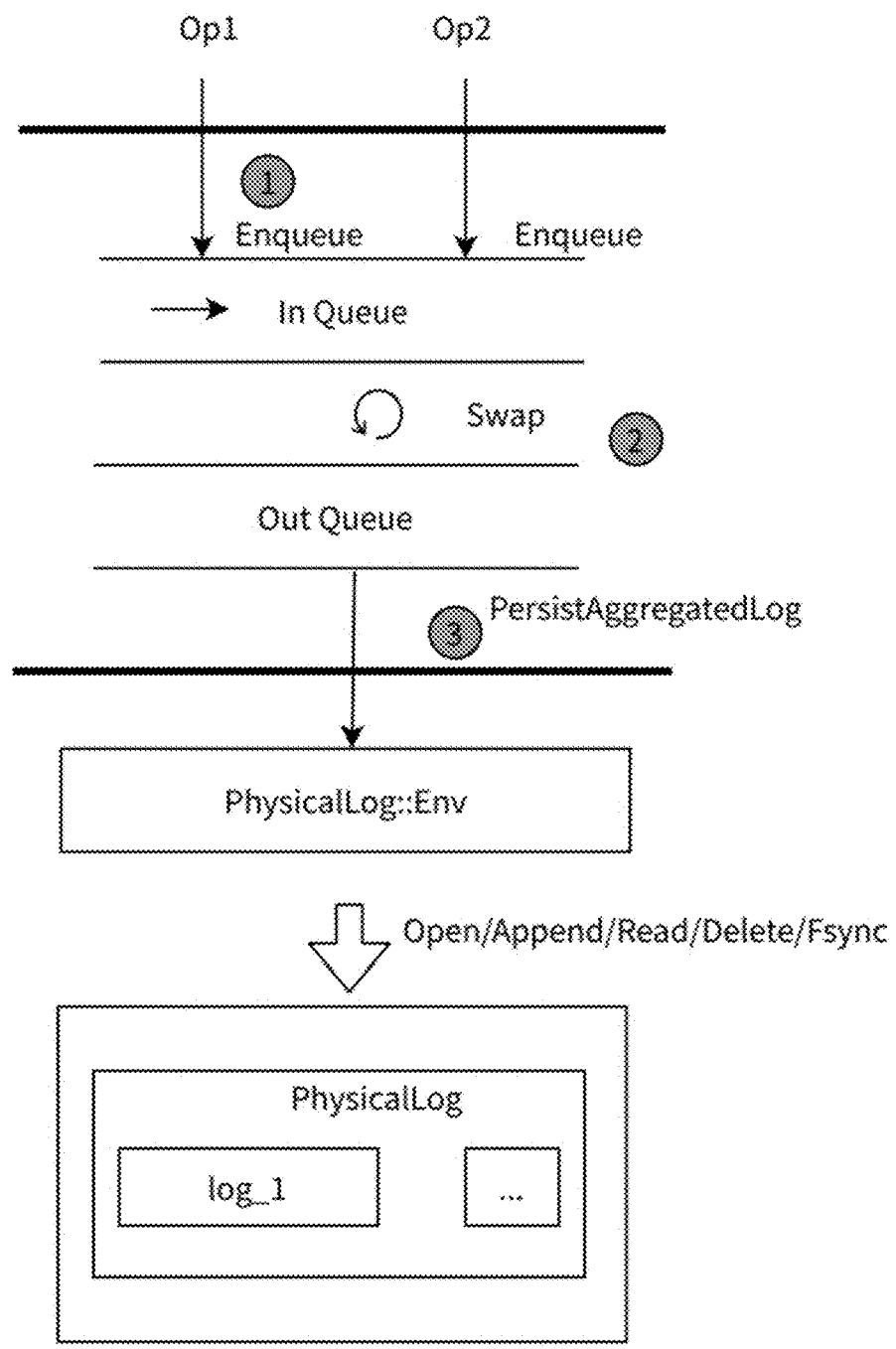
FIG. 5 shows a design of a log engine for a shared log according to an embodiment.

FIG. 5 shows a design of a log engine for a shared log according to an embodiment. The log engine is configured to store log data in upper-layer software, for example in a database software. In an embodiment, the log engine of FIG. 5 can be the log engine 104, the log engine 202, or the log engine 400 of FIG. 4.

The log engine as shown in FIG. 5 includes a user interface manager (e.g., 410 of FIG. 4) that receives one or more user requests (e.g., Op1 and Op2), for example by way of synchronous or asynchronous APIs (e.g., 412 or 414 of FIG. 4). The log engine can further include an internal layer (e.g., internal components 415 of FIG. 4) configured to manage metadata, shared logs, and background tasks. The log engine as shown in FIG. 5 includes a backend layer (e.g., 440 of FIG. 4) configured to interface with a file system, for example by writing logs to the physical log in order to make those logs persistent.

The log engine is configured to create one or more shared logs that consolidate multiple user operations into a predetermined number of I/O request. In the illustrated example, the log engine includes multiple user operations into one shared log and consolidates multiple user into a single I/O request. It is appreciated that the shared log may be a shared log of checkpoint files, user data, or metadata. Non-limiting examples of such user operations include append, create, delete, trim, and truncate operations. These consolidated operations can be handled with a predetermined number of I/O request to the file system. In an embodiment, the user operations may be consolidated into a single shared log and processed as a single request. In an embodiment, the operation may be consolidated into two or more requests respectively in two or more shared logs with a thread processing each shared log respectively. It is appreciated that the number of shared log is generally less than the number of users such that the processing core's processing capacity is fully utilized.

As shown in the exemplary embodiment of FIG. 5, the log engine receives operations Op1 and Op2 through a user interface. The received operations Op1 and Op2 go from an Enqueue state to an In Queue of the internal layer. The internal layer is configured to swap the In Queue with an Out Queue under particular conditions, such as the availability of processing threads, at which point the Out Queue can flush all previous contents of the In Queue to the file system, thereby making the various requests in a current In Queue persistent in the file system through a single I/O operation through the shared log.

In embodiments, multiple instances of shared logs can be used to manage different forms of data, such as user data, metadata, checkpoint files, and other files. The user data can be the log data stored by the log engine. Metadata for improving read operations can also be included in instances of shared logs within the log engine. Metadata management can include one or both of an in-memory metadata storage module using a standard map, and persistent metadata storage on a storage memory. The persistent metadata storage can take the form of, for example a log-structured merge (LSM)-like format. Metadata management within the log engine is described below and shown in FIG. 7.

Figure 6:
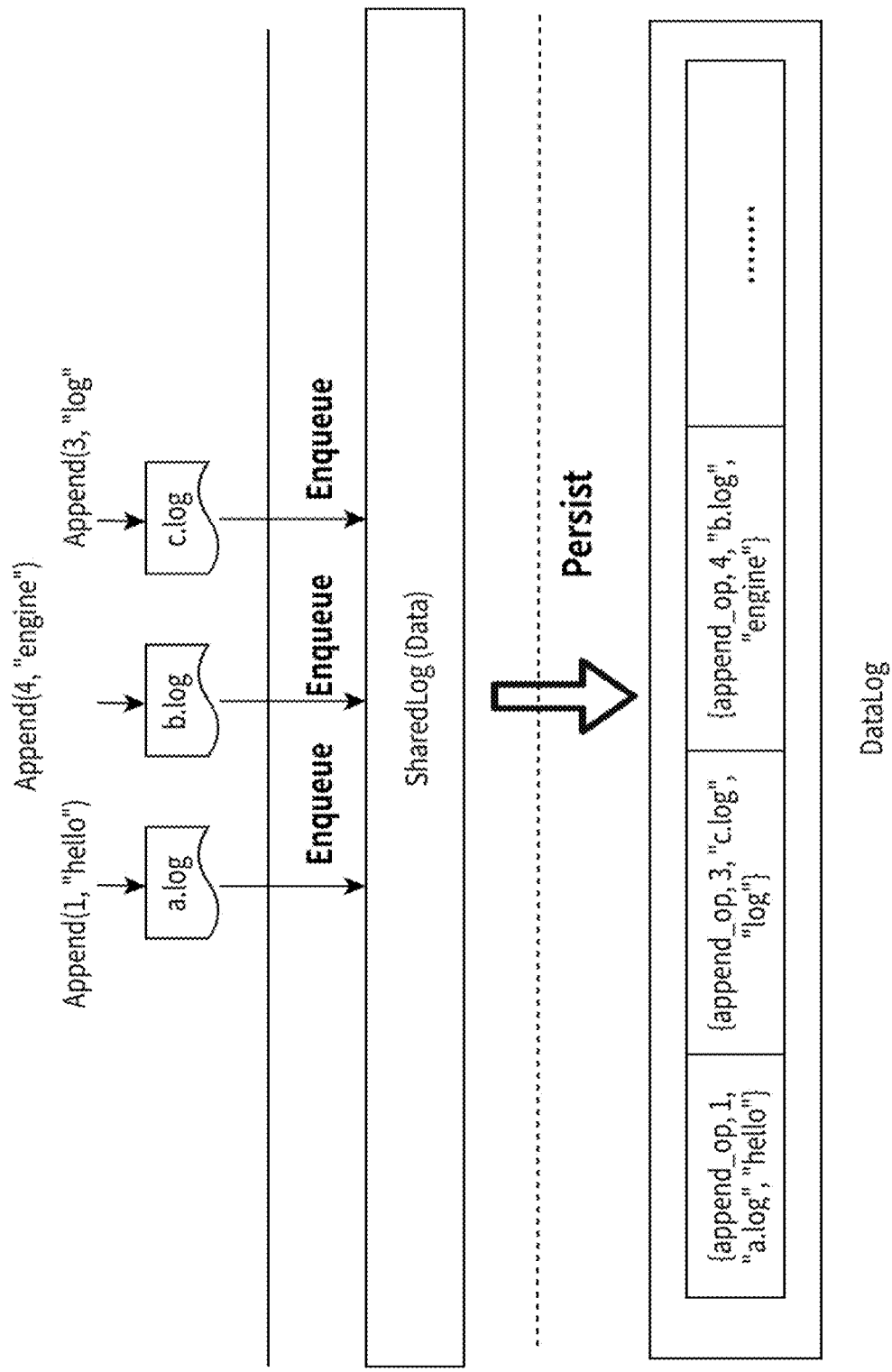
FIG. 6 shows data management for a shared log according to an embodiment.

FIG. 6 shows data management for a shared log according to an embodiment. As shown in FIG. 6, one or more clients request three "append" operations (i.e., Append (1, "hello"), Append (4, "engine"), and Append (3, "log")). In the illustrated example, sequence IDs (i.e., 1, 4, and 3) are provided in the operations and executed from the smallest to the largest sequence ID. The log engine receives these operations at the enqueue. From the enqueuer the operations are added to the shared user data log as described above regarding FIG. 5, packaging the received user operations into log records and awaits background threads to flush all the requests to disk, making the log updates persistent as shown in DataLog (e.g., a log file that records operation logs), where the respective records each include the corresponding requested appending. The order of the operations is preserved according to their sequence IDs.

Figure 7:
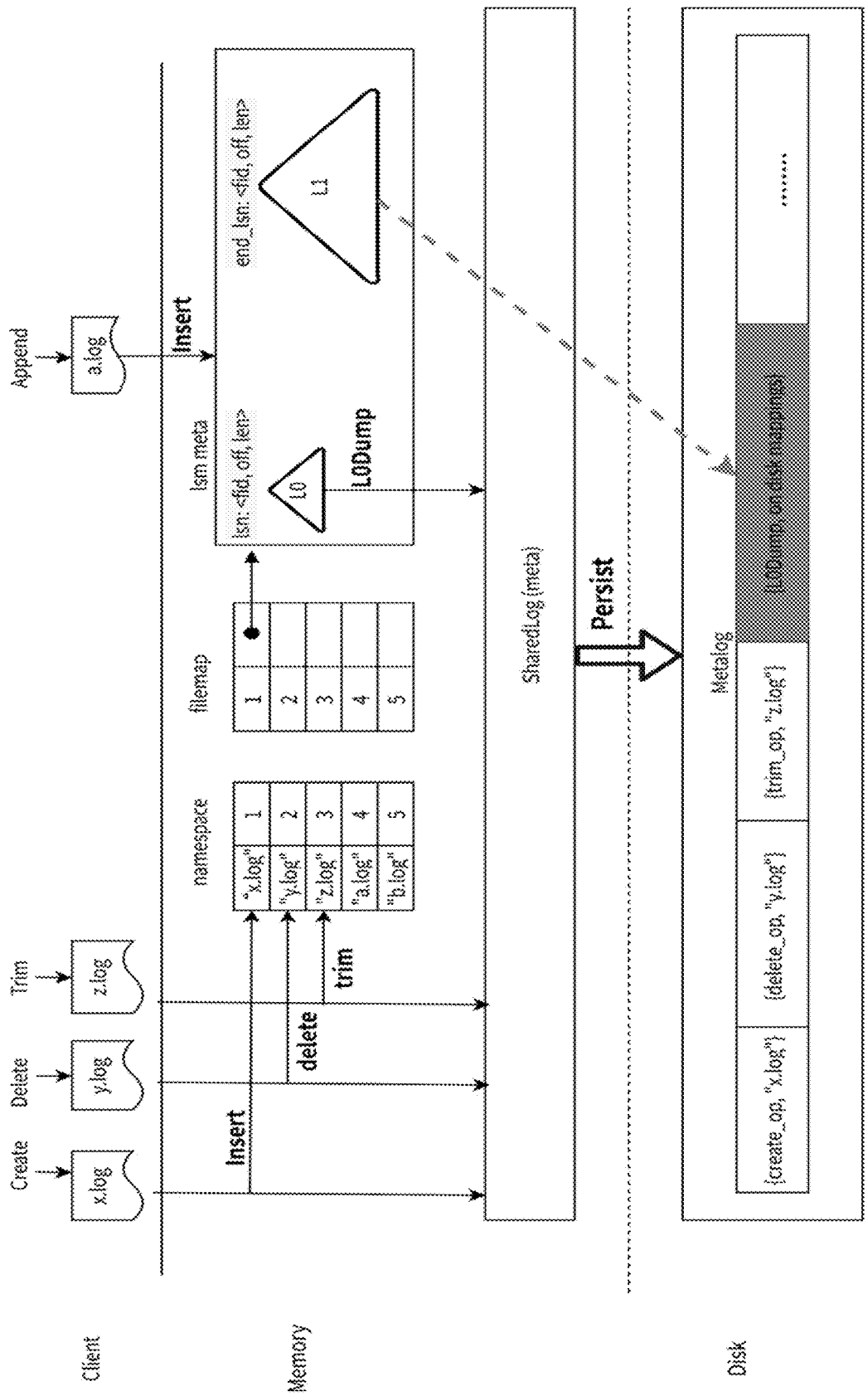
FIG. 7 shows metadata management according to an embodiment.

FIG. 7 shows metadata management according to an embodiment. In particular, FIG. 7 shows append, create, delete, and trim requests from the client, and operations in memory and the disk in response to said requests. The metadata management can be performed by the log engine as described above and shown in FIGS. 4-6.

Metadata management can include managing namespaces and filemaps of the file system, handling memory metadata for each log file, and implementing the mechanism for metadata persistency by writing to disk. The namespace can maintain the mapping of file names to file identifiers, while the filemap can track the mapping of fid to persistent metadata instances such as the LSM-format metadata discussed above with respect to FIG. 5. Each LSM meta instance can maintain mapping of a sequence ID to a location of log records in the underlying file system (e.g., lsn: <fid, offset, lsn>). An LSM meta instance can include level 0 (L0, direct index) and level 1 (L1, indirect index) parts in memory.

For an append operation, a corresponding entry is added to the respective log file's metadata. In an embodiment, each such entry is recommended to be at or about 24B in size, thereby accounting for about 3% of the total data with a 1 k record size. As the log data grows, the memory occupied by metadata can grow significantly, for example approaching 30 GB of metadata for a 1 T disk. Accordingly, storing all logfile metadata in memory may be infeasible. in an embodiment, the log engine can periodically write the log file metadata to disk to make the log file metadata persistent. In an embodiment, the metadata in L0 are encoded by an L0Dump operation and persisted in Metalog on L1, as further discussed in FIG. 8. The making persistent of log file metadata can be the access pattern involving frequent writes and infrequent reads, with a high probability of reading recently written data. To address this, the log engine can maintain the latest metadata entries in memory, writes older entries to disk, and employs an indirect map table in memory to point to the on-disk metadata entries.

Figure 8:
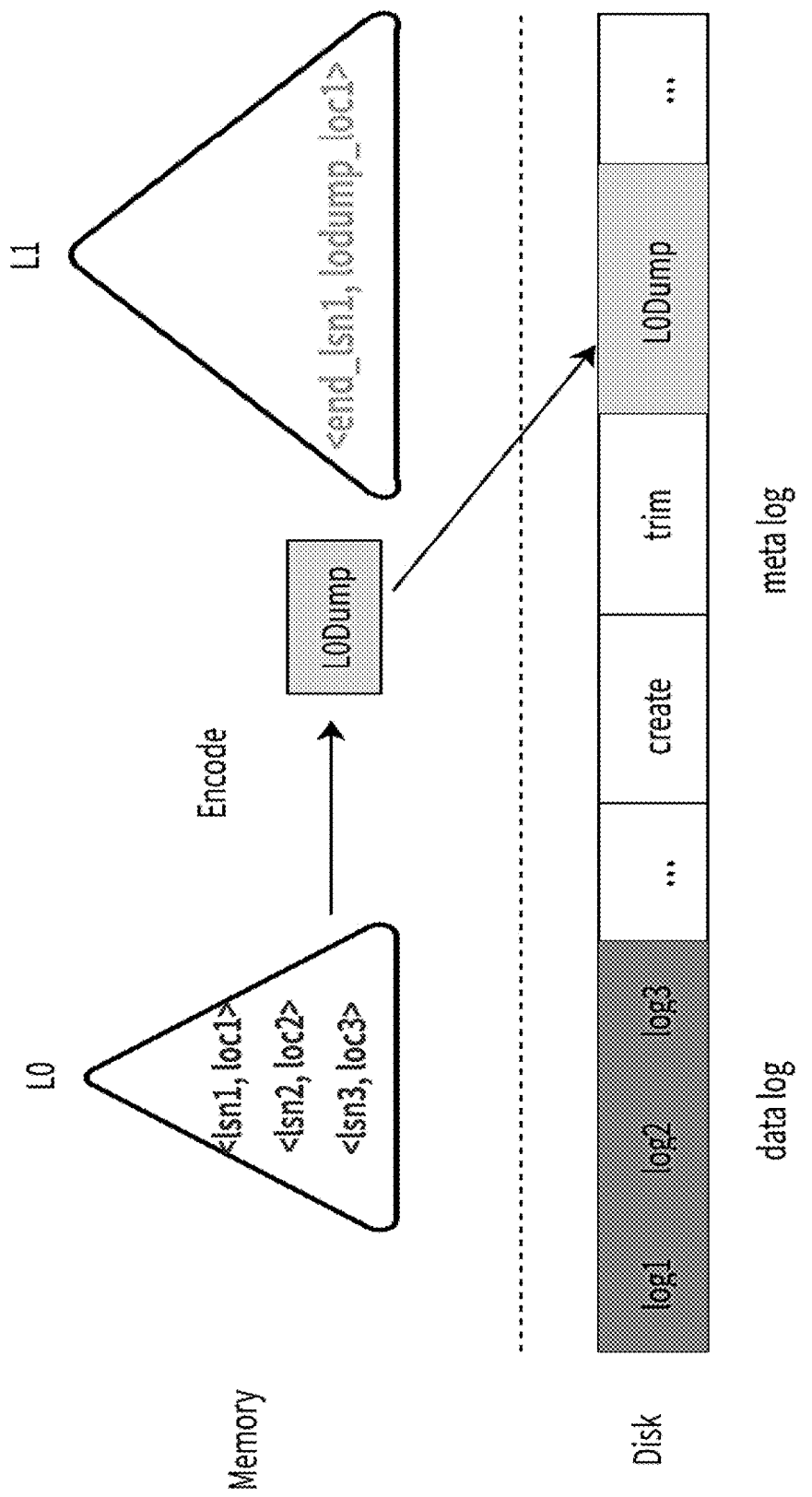
FIG. 8 shows making metadata persistent to a disk according to an embodiment.

FIG. 8 shows making metadata persistent to a disk according to an embodiment. The making persistent of the metadata can include log file creation and/or deletion. The making persistent of the metadata can include modifications to the namespace and filemap, trimming log files, requiring actions on LSM meta for efficient metadata management, and/or the "L0Dump" operation, which involves making L0 mapping persistent by encoding said L0 mapping to disk and saving the on-disk location of said L0 mapping in L1.

Figure 9:
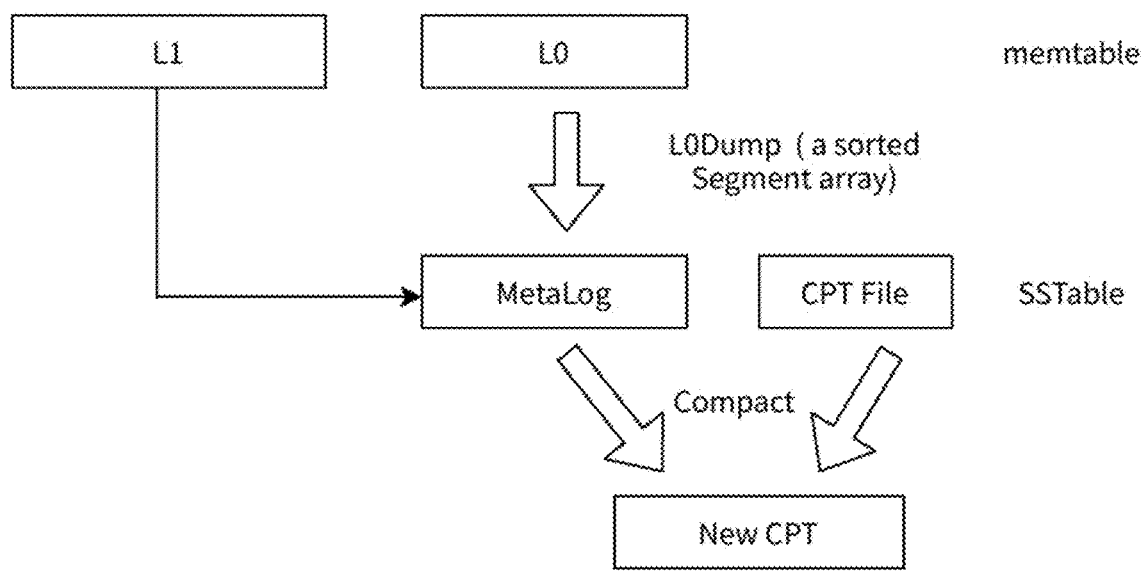
FIG. 9 is a schematic view of the checkpoint and compaction manager according to the embodiment of FIG. 4.

FIG. 9 is a schematic view of the checkpoint and compaction manager 444 according to the embodiment of FIG. 4. The checkpoint and compaction manager 444 triggers when metadata log file in-memory undergoes a rollover, e.g., when metadata log exceeds a predetermined file size.

The checkpoint and compaction manager 444 begins the rollover by scanning the namespace to obtain the metadata saved in volatile memory (e.g. in L0) at a first namespace. The L0Dump function encodes L0 information to a persistent data format to be combined with L1 metadata. The L1 metadata is already saved in the persistent data format. Then, the manager 444 performs a compaction to combine L1 metadata, encoded L0 metadata, and the CPT file (e.g., the previous checkpoint file). This compaction process generates formatted metadata configured to persistent storage in CPT files. The compacted metadata are written into a new CPT file. The L1 in memory is also updated to incorporate and persist L0 metadata of the first namespace. Then, the manager 444 proceeds to the next namespace and iterated until all metadata in L0 have been processed and written into the new CPT file.

In an embodiment, the manager 444 employs a fuzzy checkpoint to reduce the blocking of threads during the metadata rollover process. The manager 444 locks small sections of LSM metadata for each file for a brief period, avoiding activating the entire log engine's global lock. By using fuzzy checkpoint, disruptions to user threads is reduced, ensuring smoother and more efficient management of the log engine's metadata and namespace.

Figure 10:
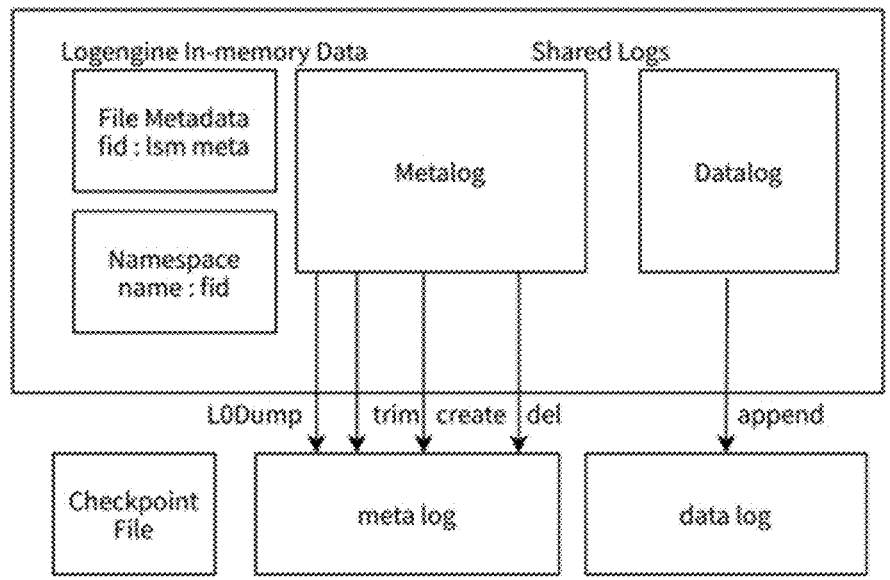
FIG. 10 illustrates the design of a recovery manager according to an embodiment.

FIG. 10 illustrates the design of a recovery manager according to an embodiment. In an embodiment, the recovery manager can be the recovery manager 450 according to the embodiment of FIG. 4.

As shown in FIG. 10, the recovery manager recovers data logs after a crash or failure. In an embodiment, the recovery manager includes a ReadCheckpoint function, a ScanMetalog function, a ScanDatalog function, and a recoverL0 function.

The read ReadCheckpoint function reads the checkpoint file to reconstruct data structures, such as the namespace (mapping file names to file IDs), filemap (mapping file IDs to LSM meta instances), and the L1 mapping for each logfile. The checkpoint provides a starting point for recovery. For example, the recovery manager begins recovery process by reading the checkpoint file and utilizing the data stored within to reconstruct the namespace, filemap, and L1 mapping for each log file (e.g., Metalog, Datalog, and the like).

The ScanMetalog function instructs the recovery manager to scan the Metalog file pointed by the checkpoint. The ScanMetalog function updates the namespace, filemap, and L1 mappings based on the operations recorded in the Metalog. To optimize recovery time, a "fuzzy checkpoint" approach is used to skip redundant operations. For instance, if a delete operation is encountered, the recovery manager checks if the filename exists in the namespace. If not, the delete operation has already been successfully committed and does not need to be redone.

For example, the Metalog file referenced by the checkpoint is scanned to update the namespace, filemap, and L1 mappings. Then, to reduce disruption to users the recovery manager proceeds with checkpointing by locking a specific file is being processed, and leaving other files unlocked such that user can modify other files concurrent with the checkpointing by the recovery manager. The recovery manager can employ a fuzzy checkpointing approach, the checkpoint's time period overlaps with the latest metalog's time period, enabling certain operations to be skipped.

In an embodiment, when the recovery manager encounters a delete operation, the recovery manager checks or determines whether the filename exists in the namespace. If the filename is not present, the delete operation has already been successfully executed and the delete operation is skipped.

In an embodiment, when the recovery manager encounters a create operation, the recovery manager checks or determines whether the file exists in the namespace. If the file exists, the creates operation had already been successfully executed and the create operation is skipped.

In an embodiment, when the recovery manager encounters a trim operation, the recovery manager checks a maximum sequence ID value stored in the checkpoint file. Comparing the maximum sequence ID value with the maximum sequence ID value in the data log in L0, if the maximum sequence ID reflects the maximum sequence ID provided after the trim operation, the trim operation has already been successfully executed and the trim operation is skipped.

In an embodiment, the recovery manager suspends L0Dump function during the checkpointing process. The L1 mapping is not updated as a single background thread shared between the recovery manager and the L0Dump manager 446 is occupied by the recovery manager. Once the recovery manager completes scanning of the Metalog, the L1 mappings have been restored.

Then, the ScanDataLog function scans the data log to replay append entries. The updates in the append entries are replayed based on the sequence ID stored during the L0Dump operation. For example, the recovery manager 450 scans the Datalog. Utilizing the data sequence ID from L0Dump, an evaluation is made to determine whether an append entry requires replaying. Only the updates within the append entries are replayed.

Then, the recoverL0 function includes, after the Datalog is scanned, the recovery manager recovering each LSM metadata's L0 entries, ensuring the data structures are consistent. For example, following the data log scanning and the conclusion of the recovery process, the L0 entries for each LSM's metadata are restored. The recovery process reaches its culmination, and the log engine is operational, capable of accepting user read and write requests. At this point, the recovery process is complete, and the log engine is recovered, ready to accept user read and write requests. The recovery manager has ensured that the system's metadata and data structures are in a consistent state, providing reliability and durability for the log engine.

ASPECTS

It is appreciated that aspects 1-8, 21, and 22, can be combined with any one of aspects 9-15 and/or aspects 16-20.

Aspect 1. A log engine for logging data operation in a file system, the log engine comprising: a user interface module configured to receive a plurality of data operation logs that respectively record a data operation and a sequence ID corresponding to an order of the data operation being performed; and a shared log manager configured to provide an in queue configured to consolidate the plurality of data operation logs, and swap the plurality of data operation logs to an out queue with the plurality of data operation logs being ordered based on the sequence ID and saved in a shared log.

Aspect 2. The log engine of aspect 1, further comprising a key-value file system collaborator configured to persist the shared log in a predefined file size allocation for updating the shared log.

Aspect 3. The log engine of aspect 1 or 2, further comprising, when saving the shared log in a persistent storage, a key-value file system collaborator is configured to omit metadata on a file size of the shared log.

Aspect 4. The log engine of any one of aspects 1-3, wherein the shared log manager is configured to request an extend of memory allocation for storing the shared log when the shared log having a file size exceeds a predefined file size allocation.

Aspect 5. The log engine of any one of aspects 1-4, wherein the shared log includes the plurality of data operation logs in sequential order based on the sequence ID and extended memory allocations such that tail latency from random write is avoided.

Aspect 6. The log engine of any one of aspects 1-5, further comprising a metadata manager, the metadata manager configured to make a log file of a metadata log persistent when the log file exceeds a predefined file size.

Aspect 7. The log engine of any one of aspects 1-6, further comprising a garbage collection module of the log engine, the garbage collection module configured to chronologically validate entries in the shared log.

Aspect 8. The log engine of any one of aspects 1-7, further comprising a recovery manager configured to read a checkpoint file for executing a fuzzy checkpoint to recover from a system failure.

Aspect 9. A method for logging data operation in a file system, the method comprising: receiving a plurality of data operation logs that respectively record a data operation and a sequence ID corresponding to an order of the data operation being performed; consolidating the plurality of data operation logs in a lock-free in queue; and swapping the plurality of data operation logs to an out queue with the plurality of data operation logs being ordered based on the sequence ID and saved in a shared log.

Aspect 10. The method of aspect 9, further comprising persisting the shared log in a predefined file size allocation for updating the shared log while omitting metadata on a file size of the shared log.

Aspect 11. The method of aspect 9 or 10, further comprising requesting an extend of memory allocation for storing the shared log when the shared log having a file size exceeds a predefined file size allocation.

Aspect 12. The method of any one of aspects 9-11, further comprising making a log file of a metadata log persistent, using a background thread, when the log file exceeds a predefined file size.

Aspect 13. The method of any one of aspects 9-12, further comprising chronologically validating entries in the shared log for garbage collection.

Aspect 14. The method of any one of aspects 9-13, further comprising reading a checkpoint file for executing a fuzzy checkpoint to recover from a system failure.

Aspect 15. A computer-readable medium containing instructions that, when executed by a processor, direct the processor to receive a plurality of data operation logs that respectively record a data operation and a sequence ID corresponding to an order of the data operation being performed; provide a lock-free in queue configured to consolidate the plurality of data operation logs; and swap the plurality of data operation logs to an out queue with the plurality of data operation logs being ordered based on the sequence ID and saved in a shared log.

Aspect 16. The computer-readable medium of aspect 15 further containing instructions that, when executed by the processor, direct the processor to persist the shared log in a predefined file size allocation for updating the shared log while omitting metadata on a file size of the shared log.

Aspect 17. The computer-readable medium of aspect 15 or 16 further containing instructions that, when executed by the processor, direct the processor to request an extend of memory allocation for storing the shared log when the shared log having a file size exceeds a predefined file size allocation.

Aspect 18. The computer-readable medium of any one of aspects 15-17 further containing instructions that, when executed by the processor, direct the processor to make a log file of a metadata log persistent, using a background thread, when the log file exceeds a predefined file size.

Aspect 19. The computer-readable medium of any one of aspects 15-18 further containing instructions that, when executed by the processor, direct the processor to chronologically validate entries in the shared log for garbage collection.

Aspect 20. The computer-readable medium of any one of aspects 15-19 further containing instructions that, when executed by the processor, read a checkpoint file for executing a fuzzy checkpoint to recover from a system failure.

Aspect 21. The log engine of any one of aspects 1-8, further comprising a background thread configured to remove a metadata log to persistent storage when the metadata log exceeds a predefined file size.

Aspect 22. The log engine of any one of aspects 1-8 or 21, wherein the shared log manager is configured to conduct a cyclic redundancy check for error detection in a log file.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A log engine configured to log data operation in a file system, the log engine comprising:
  a physical processor configured to execute instructions to generate:
  a user interface module configured to receive a plurality of data operation logs that respectively record a data operation and a sequence ID corresponding to an order of the data operation being performed; and
  a shared log manager, implemented with a lock-free queue, that is configured to:
  provide an in queue configured to consolidate the plurality of data operation logs, and
  swap the plurality of data operation logs to an out queue with the plurality of data operation logs being ordered based on the sequence ID and saved in memory in a shared log, wherein
  the shared log includes the plurality of data operation logs in sequential order based on the sequence ID and extended memory allocations such that tail latency from random write is avoided, wherein the extended memory allocations result from an extend of memory allocation for storing the shared log when the shared log having a file size exceeds a predefined file size allocation.

2. The log engine of claim 1, wherein the processor is configured to further generate:
  a key-value file system collaborator configured to persist the shared log in the predefined file size allocation for updating the shared log; and
  wherein the shared log manager is further configured to request the extend of memory allocation for storing the shared log when the shared log having the file size exceeds the predefined file size allocation.

3. The log engine of claim 1, wherein the processor is configured to further generate:

when saving the shared log in a persistent storage, a key-value file system collaborator configured to omit metadata on the file size of the shared log.

4. The log engine of claim 1, wherein the shared log manager is configured to conduct a cyclic redundancy check for error detection in a log file.

5. The log engine of claim 1, wherein the processor is configured to further generate:

a background thread configured to move a log file of a metadata log file to persistent storage when the metadata log file exceeds a predefined file size.

6. The log engine of claim 1, wherein the processor is configured to further generate:

a metadata manager configured to move a metadata log file to persistent storage.

7. The log engine of claim 1, wherein the processor is configured to further generate:

a garbage collection module of the log engine, the garbage collection module configured to chronologically validate entries in the shared log.

8. The log engine of claim 1, wherein the processor is configured to further generate:

a recovery manager configured to read a checkpoint file for executing a fuzzy checkpoint to recover from a system failure.

9. A method for logging data operation in a file system, the method comprising:

receiving a plurality of data operation logs that respectively record a data operation and a sequence ID corresponding to an order of the data operation being performed;

consolidating the plurality of data operation logs in a lock-free in queue; and swapping the plurality of data operation logs to an out queue with the plurality of data operation logs being ordered based on the sequence ID and saved in a shared log that includes the plurality of data operation logs in sequential order based on the sequence ID and extended memory allocations such that tail latency from random write is avoided, wherein the extended memory allocations result from an extend of memory allocation for storing the shared log when the shared log having a file size exceeds a predefined file size allocation.

10. The method of claim 9, further comprising:

persisting the shared log in the predefined file size allocation for updating the shared log while omitting metadata on the file size of the shared log; and requesting the extend of memory allocation for storing the shared log when the shared log having the file size exceeds the predefined file size allocation.

11. The method of claim 9, further comprising:

conducting a cyclic redundancy check for error detection in a log file.

12. The method of claim 9, further comprising:

making a log file of a metadata log persistent by a background thread when the log file exceeds a predefined file size.

13. The method of claim 9, further comprising:

chronologically validating entries in the shared log for garbage collection.

14. The method of claim 9, further comprising:

reading a checkpoint file for executing a fuzzy checkpoint to recover from a system failure.

15. A non-transitory computer-readable medium containing instructions that, when executed by a processor, direct the processor to:

receive a plurality of data operation logs that respectively record a data operation and a sequence ID corresponding to an order of the data operation being performed;

provide a lock-free in queue configured to consolidate the plurality of data operation logs; and swap the plurality of data operation logs to an out queue with the plurality of data operation logs being ordered based on the sequence ID and saved in a shared log that includes the plurality of data operation logs in sequential order based on the sequence ID and extended memory allocations such that tail latency from random write is avoided, wherein the extended memory allocations result from an extend of memory allocation for storing the shared log when the shared log having a file size exceeds a predefined file size allocation.

16. The non-transitory computer-readable medium of claim 15 further containing instructions that, when executed by the processor, direct the processor to:

persist the shared log in the predefined file size allocation for updating the shared log while omitting metadata on the file size of the shared log, and request the extend of memory allocation for storing the shared log when the shared log having the file size exceeds the predefined file size allocation.

17. The non-transitory computer-readable medium of claim 15 further containing instructions that, when executed by the processor, direct the processor to:

conducting a cyclic redundancy check for error detection in a log file.

18. The non-transitory computer-readable medium of claim 15 further containing instructions that, when executed by the processor, direct the processor to:

make a log file of a metadata log persistent, using a background thread, when the log file exceeds a predefined file size.

19. The non-transitory computer-readable medium of claim 15 further containing instructions that, when executed by the processor, direct the processor to:

chronologically validate entries in the shared log for garbage collection.

20. The non-transitory computer-readable medium of claim 15 further containing instructions that, when executed by the processor, direct the processor to:

read a checkpoint file for executing a fuzzy checkpoint to recover from a system failure.

\* \* \* \* \*